United States Patent [19]
Osada

[11] Patent Number: 6,004,388
[45] Date of Patent: Dec. 21, 1999

[54] NON-AQUEOUS INK FOR BALL POINT PEN, AND BALL POINT PEN

[75] Inventor: Takahiro Osada, Gunma, Japan

[73] Assignee: Mitsubishi Pencil Kabushiki Kaisha, Tokyo, Japan

[21] Appl. No.: 09/196,392

[22] Filed: Nov. 19, 1998

Related U.S. Application Data

[62] Division of application No. 08/527,573, Mar. 13, 1995, Pat. No. 5,868,511.

[30] Foreign Application Priority Data

Sep. 16, 1994 [JP] Japan ................................... 6-222102
Aug. 8, 1995 [JP] Japan ................................... 7-202211

[51] Int. Cl.$^6$ .................................................. C09D 11/00
[52] U.S. Cl. ...................................................... 106/31.57
[58] Field of Search ............................. 106/31.57, 31.85, 106/31.58, 31.86

[56] References Cited

U.S. PATENT DOCUMENTS 3,597,244  8/1971  Fookson et al. ..................... 106/31.57
4,256,494  3/1981  Yamamoto et al. .................. 106/31.85
4,687,791  8/1987  Miyajima et al. ................... 106/31.57

Primary Examiner—Mark L. Bell
Assistant Examiner—Veronica F. Faison
Attorney, Agent, or Firm—Darby & Darby

[57] ABSTRACT

A non-aqueous ink for a ball point pen is disclosed herein which is accompanied by the feature of the non-aqueous ink excellent in the so-called cap-off performance that a writing performance does not deteriorate even when the pen is allowed to stand, with a cap being removed, and the feature of an aqueous ink that a low writing pressure can be used and blobbing does not occur. This ink comprises an organic solvent having a vapor pressure of 0.2 mmHg (20° C.) or less, a colorant and a coagulant and has a non-Newtonian viscosity index of 0.2 to 0.5 and a viscosity of 200 mPa•s (25° C., 50 rpm) or less. Furthermore, the ink is characterized by containing a autolyophobic vehicle in which a contact angle to the surface of a material such as stainless steel or bronze having a high surface free energy is in the range of 5 to 40°.

8 Claims, 1 Drawing Sheet

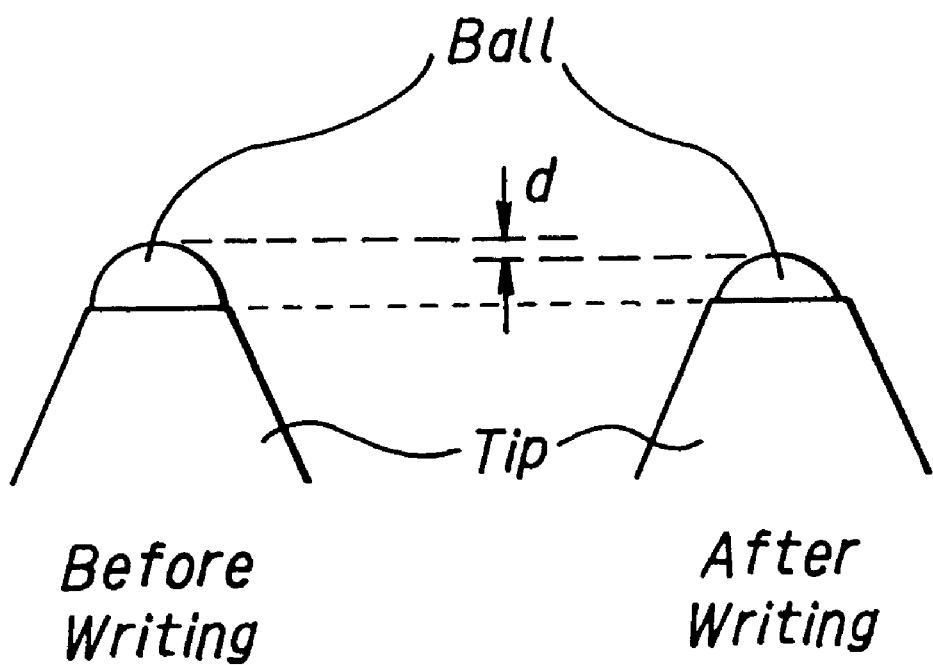

NON-AQUEOUS INK FOR BALL POINT PEN, AND BALL POINT PEN

This is a division of application Ser. No. 08/527,573, filed Sep. 13, 1995, now U.S. Pat. No. 5,868,511.

BACKGROUND OF THE INVENTION (i) Field of the Invention

The present invention relates to an ink for a ball point pen and a type of a ball point pen for directly reserving the ink in a ink tank or tube (thereinafter refered to as "the direct ink reserving type ball point pen").

(ii) Description of the Related Art

A ball point pen is constituted of a pen point comprising a ball and a tip holder, an ink reserving tube, a penholder and the like. According to this ball point pen, the ball of the pen point is rotated to transfer or sink an ink to or into a recording medium such as a paper, and particularly by the transfer, written traces drawn lines can be made. At this time, the excessive ink which has not been transferred or sunk adheres to the outer periphery of the tip holder, so that there occurs the so-called blobbing phenomenon that the ink drops at the start of writing or during writing, with the result that the sharp lines cannot be drawn sometimes.

In order to solve this problem, for example, Japanese Patent Application Laid-open Sho No. 5-40192 has disclosed a method in which the outer periphery of the chip holder is also coated with a water-repellent or an oil-repellent material so as to inhibit the ink from adhering to the outer periphery of the chip holder.

However, the resultant coating material is peeled off by friction with a writing material such as a paper during writing, so that there is a tendency that the blobbing phenomenon gradually begins to occur.

This principle is that the critical surface tension on the outer periphery of the chip holder is decreased so as to be lower than the surface tension of the ink, thereby controlling the wetness of the ink. However, since a ink originally has the low surface tension, the surface of a high-energy material such as a metal is wetted with the ink inconveniently. Then, the non-aqueous ink is easier to wet the metal than an aqueous ink.

Even if the above-mentioned coating is given on the surface of a low-energy material, there is only a slight difference between the critical surface tension of the outer periphery of the chip holder and the surface tension of the ink, and hence an oil-repellent effect is too poor to sufficiently prevent the blobbing.

Furthermore, in the usual non-aqueous ball point pen, the wear of the tip by the rotation of the ball is relatively low, because the ink has a viscosity of thousands to millions cps. However, if the viscosity of the ink is less than thousands cps, the improvement of lubrication by viscus properties cannot be expected, so that the tip is extremely worn, with the result that the starving of written lines or writing impossibility takes place.

In the conventional non-aqueous ball point pen, the ink contains a solvent having a low vapor pressure as a main component, and therefore, even if a cap is removed and a pen point is exposed to air, the starving or writing impossibility scarcely occurs. However, since the ink has a high viscosity of thousands to about one million mPa•s, a high writing pressure is required, so that writing feeling is heavy. In consequence, the fingers, arm and shoulder of a writer are easily tired by the writing for a long period of time. On the other hand, in an aqueous ball point pen, the ink has a low viscosity, and therefore the writing feeling is light, but the main solvent is water which easily vaporizes. Therefore, if the cap is removed and the pen point is exposed to air, the starving or writing impossibility occurs inconveniently.

Japanese Patent Application Laid-open Hei No. 1-299880 has disclosed a non-aqueous ink for a ball point pen in which the surface tension of an organic solvent is regulated and which has an ink viscosity of 50 to 2000 cP (25° C.) and simultaneously possesses the characteristics of the non-aqueous ink and the aqueous ink, but this kind of ink is not always satisfactory. In recent years, some aqueous inks having a middle viscosity are on the market as inks having many advantageous features from the viewpoints of quality and economy, but these inks are poorer, than the non-aqueous ink, in a cap-off performance that the writing impossibility scarcely occurs even when the cap is removed.

SUMMARY OF THE INVENTION

The present invention has been intended to solve the above-mentioned problems, and an object of the present invention is to provide a non-aqueous ink for a ball point pen simultaneously having the feature of the non-aqueous ink, i.e., excellence in the so-called cap-off performance that a writing performance scarcely deteriorates even when a cap is removed, and the feature of an aqueous ink that writing can be done at a low writing pressure and no blobbing occurs.

The non-aqueous ink for a ball point pen of the present invention has the following constitutions (1) to (7).

(1) A non-aqueous ink for a ball point pen having a non-Newtonian viscosity index of 0.2 to 0.5 and a viscosity of 200 mPa•s (25° C., 50 rpm) or less which comprises an organic solvent having a vapor pressure of 0.2 mmHg (20° C.) or less, a colorant and a coagulant.

(2) A non-aqueous ink for a ball point pen having a non-Newtonian viscosity index of 0.2 to 0.5 and a viscosity of 200 mPa•s (25° C., 50 rpm) or less which comprises (a) a autolyophobic vehicle which comprises an organic solvent having a vapor pressure of 0.2 mmHg (20° C.) or less, a pigment dispersant and if necessary, an oleophobic additive and in which a contact angle to the surface of a material such as stainless steel or bronze having a high surface free energy is in the range of 5 to 40°, (b) a coagulant and (c) a pigment.

(3) A non-aqueous ink for a ball point pen having a non-Newtonian viscosity index of 0.2 to 0.5 and a viscosity of 200 mPa•s (25° C., 50 rpm) or less which comprises (a') a autolyophobic vehicle which comprises an organic solvent having a vapor pressure of 0.2 mmHg (20° C.) or less, a dye and if necessary, an oleophobic additive and in which a contact angle to the surface of a material such as stainless steel or bronze having a high surface free energy is in the range of 5 to 40°, and (b) a coagulant.

(4) A non-aqueous ink for a ball point pen which contains a vehicle having autolyophobic properties to the surface of a material having a high surface free energy.

(5) The non-aqueous ink for a ball point pen according to the paragraph (4) which contains a solvent having autolyophobic properties.

(6) The non-aqueous ink for a ball point pen according to the paragraph (4) which contains a solvent having no autolyophobic properties and an oleophobic additive.

(7) The non-aqueous ink for a ball point pen according to the paragraph (4) which has a viscosity of 1000 mPa•s or less.

The non-aqueous ball point pen of the present invention has the following constitutions (8) to (12).

(8) A non-aqueous ball point pen which comprises a pen point comprising a ball and a tip holder, and an ink reserving tube, said ink reserving tube being filled with an ink having a non-Newtonian viscosity index of 0.2 to 0.5 and a viscosity of 200 mPa•s (25° C., 50 rpm) or less which comprises an organic solvent having a vapor pressure of 0.2 mmHg (20° C.) or less, a colorant and a coagulant.

(9) A non-aqueous ball point pen which comprises a pen point comprising a ball and a tip holder, and an ink reserving tube, said ink reserving tube being filled with an ink having a non-Newtonian viscosity index of 0.2 to 0.5 and a viscosity of 200 mPa•s (25° C., 50 rpm) or less which comprises (a) a autolyophobic vehicle which comprises an organic solvent having a vapor pressure of 0.2 mmHg (20° C.) or less, a pigment dispersant and if necessary, an oleophobic additive and in which a contact angle to the surface of a material such as stainless steel or bronze having a high surface free energy is in the range of 5 to 40°, (b) a coagulant and (c) a pigment.

(10) A non-aqueous ball point pen which comprises a pen point comprising a ball and a tip holder, and an ink reserving tube, said ink reserving tube being filled with an ink having a non-Newtonian viscosity index of 0.2 to 0.5 and a viscosity of 200 mPa•s (25° C., 50 rpm) or less which comprises (a') a autolyophobic vehicle which comprises an organic solvent having a vapor pressure of 0.2 mmHg (20° C.) or less, a dye and if necessary, an oleophobic additive and in which a contact angle to the surface of a material such as stainless steel or bronze having a high surface free energy is in the range of 5 to 40°, and (B) a coagulant.

(11) A non-aqueous ball point pen in which the outer surface of the ball point pen is made of a material having a surface free energy higher than an organic material such as a resin and which is equipped with an ink reserving tube filled with an ink having autolyophobic properties to the outer surface of the ball point pen.

(12) The non-aqueous ball point pen according to the paragraph (11) wherein the viscosity of the ink is 1000 cps or less.

BRIEF DESCRIPTION OF THE DRAWING

FIG. 1 is a view in which pen points of a ball point pen before and after writing are compared with each other.

A symbol d is a difference between the lengths of projecting balls.

DETAILED DESCRIPTION OF PREFERRED EMBODIMENTS

An organic solvent for use in a non-aqueous ink for a ball point pen of the present invention has a vapor pressure of 0.2 mmHg (20° C.) or less, and typical examples of the organic solvent include benzyl alcohol (1 mmHg/58° C.), dipropylene glycol (0.01 mmHg or less/20° C., water-soluble), propylene glycol monophenyl ether (0.01 mmHg or less/20° C.), triethylene glycol monobutyl ether (0.01 mmHg or less/20° C.), tripropylene glycol monomethyl ether (0.03 mmHg/20° C.), octyl adipate (0.001 mmHg/85° C.), dibutyl sebacate (0.001 mmHg/71° C.), dioctyl sebacate (5 mmHg/240° C.), glycerin (0.0025 mmHg/50° C.), polypropylene glycol (molecular weight=400–700), glycerin derivatives (e.g., polyoxypropyltriol, Uniol TG-1000 and Uniol TG-2000 made by Nippon Oils & Fats Co., Ltd.), ethylene glycol monophenyl ether (0.03 mmHg/20° C.), ethylene glycol monobenzyl ether (0.02 mm Hg/20° C.), ethylene glycol mono-α-methylbenzyl ether (0.02 mmHg/20° C.), ethylene glycol mono-α,α'-dimethylbenzyl ether (0.02 mmHg /20° C.), a mixture of ethylene glycol monomethylphenyl ether isomers (0.02 mmHg/20° C.), a mixture of ethylene glycol monodimethylphenyl ether isomers (0.02 mmHg/20° C.), a mixture of ethylene glycol monoethylphenyl ether isomers (0.02 mmHg/20° C.), a mixture of ethylene glycol monomethylbenzyl ether isomers (0.02 mmHg/20° C.), a mixture of ethylene glycol monoethylbenzyl ether isomers (0.02 mmHg/20° C.), ethylene glycol monocyclohexyl ether (0.01 mmHg/20° C.), ethylene glycol monodihydro-α-tervinyl ether (0.02 mmHg/20° C.), propylene glycol monophenyl ether (0.03 mmHg/20° C.), propylene glycol monobenzyl ether (0.03 mmHg/20° C.), propylene glycol monocyclohexyl ether (0.04 mmHg/20° C.), propylene glycol monotervinyl ether (0.02 mmHg/20° C.), diethylene glycol monophenyl ether (0.02 mmHg/20° C.), diethylene glycol monobenzylphenyl ether (0.02 mmHg/20° C.), diethylene glycol monoethylphenyl ether (0.02 mmHg or less/20° C.), ethylene glycol monoethylbenzyl ether (0.02 mmHg or less/20° C.), diethylene glycol monocyclohexyl ether (0.02 mmHg/20° C.), diethylene glycol monomethyl ether (0.18 mmHg/25° C.), diethylene glycol monodihydro-α-tervinyl ether (0.02 mmHg/20° C.), dipropylene glycol monophenyl ether (0.02 mmHg/20° C.), dipropylene glycol monobenzyl ether (0.02 mmHg/20° C.), dipropylene glycol monocyclohexyl ether (0.03 mmHg/20° C.), dipropylene glycol monotervinyl ether (0.02 mmHg/20° C.) and the like.

The amount of the solvent is in the range of 50 to 95% by weight based on the weight of the ink. If the amount is less than 50% by weight, a cap-off performance deteriorates unpreferably.

A autolyophobic vehicle which can be used in the ink of the present invention is a vehicle (a) which comprises an organic solvent having a vapor pressure of 0.2 mmHg or less, a pigment dispersant and if necessary, an oleophobic additive and in which a contact angle to the surface of a material such as stainless steel or bronze having a high surface free energy is in the range of 5 to 40°, or a vehicle (a') which comprises an organic solvent having a vapor pressure of 0.2 mmHg or less, a dye and if necessary, an oleophobic additive and in which a contact angle to the surface of a material such as stainless steel or bronze having a high surface free energy is in the range of 5 to 40°. To this vehicle, a resin, an anticorrosive agent, a lubricating oil and the like can be added, so far as they do not impair the autolyophobic properties of the vehicle.

The autolyophobic vehicle can inhibit a tip holder from wetting, whereby the formation of ink drops which causes a blobbing phenomenon can be suppressed. That is to say, in order to prevent the blobbing phenomenon, the vehicle should possess a contact angle of a value of about 180° C. in principle, but in fact, it preferably has a contact angle of 40° or less. This reason is that the organic solvent which can be used in the ink originally has a small surface tension $\gamma_L$ and hence a difference between this surface tension $\gamma_L$ and a critical surface tension $\gamma_C$ is slight, so that a large contact angle (θ) such as 180° mentioned above cannot be taken, and a large value of the contact angle such as 180° is not preferable in view of a writing performance peculiar to the ink.

If the contact angle is 5° or less, the blobbing phenomenon takes place inconveniently, irrespective of the viscosity of the ink which will be described hereinafter.

The autolyophobic vehicle is adsorbed on a solid-liquid interface when the respective molecules of constitutional components or certain molecules contact with a high-energy surface, thereby lowering the critical surface tension of the solid, so that a low-energy surface is made to prevent the molecules from spreading on the surface of the solid and to thereby inhibit wetting. The autolyophobic solvent means a solvent in which the critical surface tension $\gamma_C$ of the adsorption film of the solvent molecules themselves is smaller than the surface tension of the solvent, but even when the solvent itself has no autolyophobic properties, the lyophobic state can be obtained in the case that the $\gamma_C$ of an adsorption monolayer of solute molecules dissolved in the solvent is smaller than the surface tension $\gamma_{1V}$ of this solvent. Such solute molecules are called oleophobic additives, and such an adsorption monolayer is called an oleophobic monolayer. The mechanism for exerting such autolyophobic properties is constituted of the oleophobic solvent or the combination of the solvent having no oleophobic properties and the oleophobic additive, but if necessary, a resin, an anticorrosive agent, a lubricating oil and the like may be added, so far as they do not destroy the mechanism. Furthermore, it is also possible that a surface active agent is added so as to regulate the surface tension and to thereby control the autolyophobic properties.

Examples of a solvent having the autolyophobic properties include 1-octanol, 2-octanol, benzyl alcohol, ethylene glycol monophenyl ether, diethylene glycol monomethyl ether and 2-ethyl-1-hexanol. It is also possible that the oleophobic additive is added to the autolyophobic solvent so as to further increase the autolyophobic properties.

Examples of the oleophobic additive include perfluoroalkylphosphoric acid esters and alkylphosphoric acid esters. However, the effect of the oleophobic additive varies with an interaction such as solubility in the solvent, and therefore the oleophobic additive should be selected in consideration of the kind of solvent. For example, in the case that the solvent is polypropylene glycol (average molecular weight=400) or tripropylene glycol monobutyl ether, the perfluoroalkylphosphoric acid ester is preferable, and in the case of ethylene glycol monophenyl ether solvent, the alkylphosphoric acid ester is effective as the oleophobic additive.

As the oleophobic additives, fluorocarbon and silicone oil are effective when the surface tension of the liquid is 24 dyne/cm or less, and fatty acids and other aliphatic polar compounds are effective when it is in excess of 24 dyne/cm. If the surface tension of the liquid is 30 to 32 dyne/cm, polar compounds which are the derivatives of branched and cyclic hydrocarbons can be used. They can be controlled by the viscosity and the surface tension of the vehicle, if necessary.

As a colorant for use in the ink for the ball point pen of the present invention, dyes and pigments can usually be used which can be employed in writing implements or inks for coating materials. The dye becomes one component of the vehicle, but the pigment does not become the component of the vehicle.

As the dyes, basic dyes, acid dyes and direct cotton dyes which may be solubilized or microencapsulated are usable. Examples of the dyes include Barifast Black #1802, Barifast Black #1805, Barifast Black #3820, Barifast Violet #1701, Barifast Yellow AUM and Barifast Yellow #3104 (made by Orient Chemical Industry Co., Ltd.), Spiron Violet C-RH, Spiron Black CMH Special, Spiron Yellow C-GNH, Spiron Orange GRH and Spiron Red BEH (made by HODOGAYA CHEMICAL CO., LTD.), Auramines, Rhodamines, Methyl Violets, Malachite Greens, Crystal Violets, Victoria Blues BOH and the like.

As the pigment, an inorganic pigment or an organic pigment can be directly used, and a processed pigment or a dispersed toner obtained by surface modification with a resin or a surface active agent may also be used. Examples of the pigment include titanium oxide, carbon black, phthalocyanine compounds, azo compounds, anthraquinone compounds, quinacridone compounds, Microlease Color (made by Ciba-Geigy) and Fuji AS Color (made by Fuji Dyestuff Co., Ltd.). No particular restriction is put on the amount of the colorant, and this amount depends upon the solubility and the dispersion force of the colorant as well as a desired hue and density. The amount of the colorant is closely concerned with the starving phenomenon and the writing failure of written letters and drawn lines. If the colorant is used in an excessive amount, the effect is low even in the case of the ink composition of the present invention, and if it is used in an insufficient amount, the starving phenomenon and the writing impossibility can be extremely decreased, but the color development of the lines drawn by the ball point pen is poor. In consequence, the amount of the colorant to be used is in the range of 0.5 to 50% by weight.

Examples of the pigment dispersant which is one of the vehicle components include usual resins and oligomers for pigment dispersion such as polyvinyl butyrals, polyvinyl pyrrolidones, polyacrylic acids, styrene-maleic acid resins and the like. Typical examples of the pigment dispersant include Solsperses made by ICI which are the resins and oligomers, and Eslec B BM-1 and Eslec B BL-1 made by Sekisui Chemical Co., Ltd. which are the polyvinyl butyrals. Moreover, an anionic, a nonionic or a cationic surface active agent may be added as a main component or an auxiliary component.

The amount of the pigment dispersant depends upon the kind of pigment and the color density of the ink, and it is in the range of 0.1 to 40% by weight based on the weight of the pigment and in the range of 0.05 to 20% by weight based on the total weight of the ink.

Examples of a coagulant which can be used in the present invention include inorganic compounds such as synthesized fine powder silica, bentonites, extremely fine precipitated calcium carbonate and the like; composite compounds such as a bentonite, having inorganic cations between crystal layers, treated with a cationic organic compound, an organic bentonite (a modified clay) obtained by the replacement of hydrate water, a surface-treated calcium carbonate and the like; organic compounds such as metallic soaps, hydrogenated castor oils, polyamide waxes, benzylidene sorbitols, amide waxes, microgels, polyethylene oxides, polymerized vegetable oils such as polymerized linseed oils and fatty acid dimers and the like; and surface active agents such as sulfuric esters (sulfated oils, higher alcohols and sulfates), nonionic surface active agents (fatty acid esters and polyethers) and the like. Typical trade manes of the coagulants include organic bentonites such as Benton SD-2 and Benton 27 made by NL Chemicals Co., Ltd., TIXOGEL VZ and TIXOGEL EZ made by Nissan Gardler Catalyst Co., Ltd., EX-0101 made by SUD Chemicals, Inc., silica compounds such as Mizcasil P-801 made by Mizusawa Chemical Industry Co., Ltd., Aerosil 380 and Aerosil COK84 made by Nippon Aerosil Co., Ltd., polyamides of fatty acids such as Tarlene VA-100, VA-500 and VA-800 made by Koeisha Oil & Fat Chemicals, Inc., ASA T-1, T-51 and T-350F made by Ito Seiyu Co., Ltd and the like. The content of the coagulant is in the range of 0.01 to 10%, preferably 0.5 to 5%.

The ink of the present invention has a non-Newtonian viscosity index n of 0.2 to 0.5 (25° C.). This n can be defined by the following fluid equation $$S = \mu D^n$$

wherein S is a shearing stress, and D is a shear rate.

The non-Newtonian viscosity index n is preferably in the range of 0.2 to 0.4. If the index n is more than 0.5, a direct flow phenomenon occurs, and if it is less than 0.2, the writing performance of the ink is poor, so that starving and writing impossibility take place.

The viscosity of the ink according to the present invention is 100 mPa•s (25° C., 50 rpm) or less, preferably 200 mPa•s (25° C., 50 rpm) or less, more preferably 100 mPa•s (25° C., 50 rpm) or less, most preferably 50 mPa•s (25° C., 50 rpm) or less. The autolyophobic properties and the contact angle, which do not contain the factor of time, denote an equilibrium state. If the vehicle exerts the autolyophobic properties, the blobbing phenomenon ought to be inhibited in principle, but in fact, when the viscosity is high, a velocity at which a liquid drop is repelled is low, so that the effect of the autolyophobic properties decreases inconveniently.

That is to say, the generation of the blobbing phenomenon is affected by both of the autolyophobic properties (the contact angle) of the vehicle and the viscosity of the ink. Therefore, if the viscosity is 200 mPa•s or less and the contact angle is large, the blobbing phenomenon can be suppressed, but if the viscosity is more than 200 mPa•s and the contact angle is small, the blobbing phenomenon occurs.

The ball point pen of the present invention is constituted of a pen point comprising a ball and a tip holder, an ink reserving tube and a joint for joining the tip to the ink reserving tube, and the ink reserving tube is filled with the above-mentioned ink for the ball point pen of the present invention. As a material for the tip holder, there can be used a material having a surface energy higher than that of the solvent for use in the non-aqueous ink, and typical examples of such a material include metals such as stainless steel and nickel silver, and ceramics having practical strength.

In the non-aqueous ink of the present invention, the blobbing does not occur under a low writing pressure and the tip is scarcely worn even if a long line is continuously drawn, so that the starving and the writing impossibility take place, because the vehicle of the ink with which the ball point pen is filled has the autolyophobic properties to the surface of the material having a high energy (a metal such as stainless steel) used for the tip holder and the viscosity of the ink is 1000 mPa•s or less, preferably 200 mPa•s or less.

In general, by lowering the viscosity of the ink, a light writing feeling can be realized, but if the non-aqueous ink is used and its viscosity is low, the blobbing increases owing to the increase of a wetting rate and the decrease of lubricating properties. When the viscosity of the ink is high, the tip wear is relatively low, but it increases with the deterioration of the viscosity. The ink viscosity of 200 mPa•s or less is in a boundary lubrication region, and in this region, the extreme wear occurs. As in the present invention, however, by imparting the autolyophobic properties to the ink, the non-aqueous ball point pen can be obtained in which the tip holder is scarcely wetted with the ink at the time of the rotation of the ball, so that the blobbing decreases, and simultaneously, by virtue of the autolyophobic properties of the ink, liquid molecules or the oleophobic additive is adsorbed on the surface of a solid such as a metal, and the lubricating properties are improved owing to the presence of the oriented molecules, and in consequence, the wear can be decreased, with the result that a smooth light writing feeling can be attained.

The viscosity of the ink has an influence on the wetting velocity, the lubricating properties and the writing feeling. The blobbing prevention effect of the ink can be exerted by lowering the viscosity. The decrease of the viscosity from millions mPa•s to thousands mPas•s scarcely affects the blobbing prevention effect, but when the viscosity is 1000 mPa•s or less, the blobbing prevention effect can be obtained, and when it is 200 mPa•s or less, this effect appears remarkably. Also with regard to the writing feeling, even if the viscosity decreases from millions mPa•s to thousands mPa•s, this writing feeling scarcely changes, but when it is 1000 mPa•s or less, the writing feeling can be improved, and when it is 200 mPa•s or less, this effect can be remarkably improved.

A material having a high surface free energy referred to in the present invention is usually a material having a surface free energy of 50 to thousands erg/cm$^2$, and in general, this kind of material is easily wetted with the solvent used in the non-aqueous ink or the ink itself. Typical examples of the material having a high surface free energy include metals such as stainless steel, bronze and nickel silver, metal oxides, metal salts, and nonmetals such as glasses and ceramics.

In the ink according to the present invention, another resin and an adhesive can be used as needed, in addition to the coagulant and the resin as the dispersant. Furthermore, an anticorrosive agent, a lubricant, an antiseptic agent and the like can also be used. These materials are those which never impair the autolyophobic properties of the vehicle. In the case that the ink is prepared by adding the coagulant, the pigment and the like to this vehicle, it seems sometimes that the autolyophobic properties are apparently lost by the cohesive force of the coagulant, and for this reason, it is difficult to evaluate the lyophobic properties by measuring the contact angle of the ink. With regard to the ink of the present invention, when shearing stress is applied to the ink by the rotation of the ball, the cohesive force of the coagulant is weakened, so that the autolyophobic properties which the vehicle originally has can be exerted.

In the ink regarding the present invention, the vehicle preferably has the autolyophobic properties to the surface of the material having a high surface free energy. The above-mentioned solvent itself preferably has the autolyophobic properties, but when the solvent has no autolyophobic properties, this insufficiency can be supplemented by adding an oleophobic additive to the solvent. Fundamentally, it is ideal that the vehicle itself has the autolyophobic properties to the surface of the material having a high surface free energy.

An ink for a ball point pen of the present invention does not bring about a blobbing phenomenon and a direct flow phenomenon, and therefore a clean line can be drawn without transferring a mass of the ink at the start of writing. Additionally, in the ink, a cap-off performance is excellent, and during writing, a writing feeling is also good.

EXAMPLES

The present invention will be described in more detail with reference to examples and comparative examples.

Tests for evaluating inks were carried out as follows. Ball point pens used in the tests were each equipped with a polypropylene tube having an inner diameter of 2.0 mm and a stainless steel tip (a ball was made of a super hard alloy and had a diameter of 0.7 mm). Each ball point pen was filled with each of inks obtained in examples and comparative examples, and the following tests were then made.

Autolyophobic properties (Vehicle):

An ink or a vehicle was dropped on a stainless steel plate, and then observed by a microscope to measure an contact angle.

Autolyophobic properties (Ink):

An ink was dropped on a stainless steel plate on a desk, and the plate was then vertically stood. At this time, the flow state of the ink drop was observed.

○ . . . On a point at which the ink was dropped or along a position which the ink flowed, the ink was repelled, so that the place was not wetted (a state like the surface of a waxed car).

Δ . . . The ink was repelled, but not completely.

x . . . The point at which the ink was dropped or the position in which the ink flowed was wetted with the ink (a state like a trace along which a slug crawled).

Viscosity:

The viscosity was measured at 25° C.-50 rpm in Examples 1 to 5 and Comparative Examples 1 to 7, and at 15° C.-10 rpm in Examples 6 to 9 and Comparative Examples 8 to 11 by the use of an E type viscometer (EMD model and EHD model, made by Tokyo Keiki Co., Ltd.). Since the viscosity was high only in Comparative Example 5, the EHD model was used in Comparative Example 5.

Adhesive blobbing:

After a line of 100 m was written by a mechanical writing tester, the amount of the ink which adhered to the point of a tip was observed with the naked eye to evaluate the adhesive blobbing (an average of the results of the 10 ball point pens).

◎ . . . Not adhered, ○ . . . Slightly adhered, Δ . . . Relatively largely adhered, and x . . . Very largely adhered.

Drawn line blobbing:

The drawn line blobbing was evaluated on the basis of the number of ink drops on a paper during writing (an average of the results of the 10 ball point pens).

◎ . . . 5 or less, ○ . . . 6 to 10, Δ . . . 10 to 30, and x . . . 30 or more.

Writing feeling:

The writing feeling was determined by freehand writing to evaluate the writing feeling.

Writing performance:

A spiral line was continuously written by freehand writing to observe a writing state.

Direct flow test:

The ball point pen was allowed to stand for 3 days in a thermo-humidistatic chamber at 25° C. and 65%, its pen point being downward kept, and the amount of the ink which adhered on a pen point was observed with the naked eye to evaluate a direct flow state.

Small amount of the adhered ink: ○>Δ>x: Large amount of the adhered ink.

Wear:

A mechanical writing test was carried out in a thermo-humidistatic chamber at 25° C. and 65% under a load of 200 g. The wear was evaluated by measuring a difference between the lengths of projecting balls before the writing and after the writing of 500 m.

Cap-off performance:

As a forced deterioration test, the ball point pen was allowed to stand under circumstances of 50° C. and 65% for one month, with its cap being removed, and a writing state was then observed to evaluate the cap-off performance.

○ . . . Good, Δ . . . Slight starving, and x . . . Unwritable.

Non-Newtonian viscosity index (n):

The values of viscosity (η) to viscometer rotation numbers (R) were measured by the use of an E type viscometer (EMD model and EHD model, made by Tokyo Keiki Co., Ltd.), and the values of the viscosity (η) were plotted along an ordinate axis and the viscometer rotation numbers (R) were plotted along an abscissa axis of a logarithmic graph. Then, the index (n) was determined from the gradient (n−1) of the depicted curve.

The components of compositions shown in Tables 1 and 2 used in the examples and the comparative examples are as follows.

Colorants:
(1): A dye, "Barifast Black #3830" (made by Orient Chemical Industry Co., Ltd.)
(2): Carbon black, "Printex #35" (made by Degussa) (3): "Azo Pigment #1010" (made by Fuji Dyestuff Co., Ltd.)
(4): "Barifast Violet #1701" (made by Orient Chemical Industry Co., Ltd.)
(5): "Barifast Yellow #1105" (made by Orient Chemical Industry Co., Ltd.)
(6): "Spiron Black CMHsp" (HODOGAYA CHEMICAL CO., LTD.)

Pigment dispersants:
Polyvinyl butyrals were used.
(1): "Eslec B BM-1" (made by Sekisui Chemical Co., Ltd.)
(2): "Eslec B BL-1" (made by Sekisui Chemical Co., Ltd.)

Resins:
(1): "PVP K-30" (made by GAF Co., Ltd.)
(2): "PVP K-90" (made by GAF Co., Ltd.)

Solvents:
Solvent (1): Ethylene glycol monophenyl ether (0.03 mmHg/20° C.)
Solvent (2): Polypropylene glycol (Molecular weight=400) (0.02 mmHg/20° C. or less)
Solvent (3): Tripropylene glycol monobutyl ether (0.02 mmHg/20° C or less)
Solvent (4): Diethylene glycol monomethyl ether (0.18 mmHg/25° C.)
Solvent (5): Benzyl alcohol (1 mmHg/58° C.)
Solvent (6): Triethylene glycol monobutyl ether (0.01 mmHg/20° C.)
Solvent (7): Ethylene glycol monomethyl ether (9.7 mmHg/25° C.)
Solvent (8): Triethylene glycol monoethyl ether (0.01 mmHg/20° C. or less)
Solvent (9): Tripropylene glycol monomethyl ether Oleophobic additives:
(1) Perfluoroalkylphosphoric acid ester, "F-191" (made by DAINIPPON INK AND CHEMICALS, INC.)
(2) Alkylphosphoric acid ester, "RL-210" (made by Toho Chemical Industry Co., Ltd.)
(3) Oleic acid Coagulants:
(1) "Tarlen BA-600" (Kyoeisha Chemical Co., Ltd.)
(2) Lipophilic smectite, "SEN" (Cope Chemical Co., Ltd.)
(3) Lipophilic smectite, "SPN" (Cope Chemical Co., Ltd.)

Examples 1 to 5 Comparative Examples 1 to 7

Inks for ball point pens were prepared in blend ratios (parts by weight) shown in Table 1. Tests were carried out by the use of ball point pens filled with these inks, and the results are shown in Table 1.

Comparative Example 1 is concerned with an example of a vehicle having a large n value, Comparative Example 2 is concerned with an example of a vehicle having a small n value, Comparative Example 3 is concerned with an example in which a solvent having a high vapor pressure is used, Comparative Example 4 is concerned with an example in which a vehicle having a contact angle of less than 5° is used, Comparative Examples 5 and 6 are concerned with examples of high viscosities and large n values, and Comparative Example 7 is concerned with an example in which the n value is 0.5 or less and the viscosity is 200 mPa•s or more, and in this example, the flow of the ink in a capillary which is an ink flow path is poor, so that starving and writing impossibility take place.

Examples 6 to 9, Comparative Examples 8 to 11

Inks for ball point pens were prepared in blend ratios (parts by weight) shown in Table 2. Tests were carried out by the use of ball point pens filled with these inks, and the results are shown in Table 1.

TABLE 1 (I)

| | Example | | | | |
|---|---|---|---|---|---|
| | 1 | 2 | 3 | 4 | 5 |
| Colorant (1) | | 5.0 | | | |
| Colorant (2) | 6.0 | | 6.0 | | 6.0 |
| Colorant (3) | | | | 4.0 | |
| Colorant (4) | | | | | |
| Colorant (5) | | | | | |
| Dispersant (1) | | | | 1.0 | |
| Dispersant (2) | 1.0 | | 1.0 | | 1.0 |
| Resin (1) | | | | | |
| Resin (2) | | | | | |
| Solvent (1) | | 57.7 | | | |
| Solvent (2) | 10.0 | 10.0 | | | |
| Solvent (3) | | | | 10.0 | |
| Solvent (4) | 80.9 | | | 83.2 | |
| Solvent (5) | | 19.3 | | | |
| Solvent (6) | | | 89.7 | | |
| Solvent (7) | | | | | |
| Solvent (8) | | | | | 90.8 |

TABLE 1 (II)

| | Example | | | | |
|---|---|---|---|---|---|
| | 1 | 2 | 3 | 4 | 5 |
| Oleophobic additive (1) | 0.1 | | 0.3 | 0.2 | |
| Oleophobic additive (2) | | | | 0.1 | 0.2 |
| Oleophobic additive (3) | | | | | |
| Coagulant (1) | | 8.0 | | | |
| Coagulant (2) | 2.0 | | | 1.5 | 2.0 |
| Coagulant (3) | | | 3.0 | | |
| Viscosity (mPa · s, 50 rpm) | 34 | 74 | 116 | 26 | 72 |
| Viscosity index (n) | 0.47 | 0.38 | 0.38 | 0.49 | 0.31 |
| Contact angle (vehilce) | 26° | 18° | 35° | 28° | 34° |
| Blobbing | ⊚ | ○ | ⊚ | ⊚ | ⊚ |
| Writing feeling | Light | Light | Light | Light | Light |
| Writing performance | Good | Good | Good | Good | Good |
| Direct flow | ○ | ○ | ○ | ○ | ○ |

TABLE 1 (II)-continued

| | Example | | | | |
|---|---|---|---|---|---|
| | 1 | 2 | 3 | 4 | 5 |
| Cap-off performance | ○ | ○ | ○ | ○ | ○ |

TABLE 1 (III)

| | Comparative Example | | | |
|---|---|---|---|---|
| | 1 | 2 | 3 | 4 |
| Colorant (1) | | 3.0 | | |
| Colorant (2) | 6.0 | | 6.0 | 6.0 |
| Colorant (3) | | | | |
| Colorant (4) | | | | |
| Colorant (5) | | | | |
| Dispersant (1) | | | | |
| Dispersant (2) | 1.0 | | | 1.0 |
| Resin (1) | | | | |
| Resin (2) | | | | |
| Solvent (1) | | | | |
| Solvent (2) | | | 10.0 | 10.0 |
| Solvent (3) | | | | |
| Solvent (4) | | 92.9 | | |
| Solvent (5) | | | | |
| Solvent (6) | 90.0 | | | |
| Solvent (7) | | | 79.9 | |
| Solvent (8) | | | | 81.2 |

TABLE 1 (IV)

| | Comparative Example | | | |
|---|---|---|---|---|
| | 1 | 2 | 3 | 4 |
| Oleophobic additive (1) | 0.2 | 0.1 | 0.1 | |
| Oleophobic additive (2) | | | | |
| Oleophobic additive (3) | | | | |
| Coagulant (1) | | | | |
| Coagulant (2) | | 4.0 | 4.0 | 1.8 |
| Coagulant (3) | 2.8 | | | |
| Viscosity (mPa · s, 50 rpm) | 59 | 168 | 18 | 52 |
| Viscosity index (n) | 0.58 | 0.19 | 0.49 | 0.45 |
| Contact angle (vehilce) | 35° | 35° | 25° | 5°> |
| Blobbing | ⊚ | — | ○ | x |
| Writing feeling | Light | — | Light | Light |
| Writing performance | Good | Bad | Good | Good |
| Direct flow | x | — | ○ | ○ |
| Cap-off performance | ○ | — | x | ○ |

TABLE 1 (V)

| | Comparative Example | | |
|---|---|---|---|
| | 5 | 6 | 7 |
| Colorant (1) | | | |
| Colorant (2) | | | 6.0 |
| Colorant (3) | | | |
| Colorant (4) | 16.0 | 7.8 | |
| Colorant (5) | 14.0 | 6.8 | |
| Colorant (6) | 5.0 | 2.4 | |

TABLE 1 (V)-continued

|  | Comparative Example | | |
|---|---|---|---|
|  | 5 | 6 | 7 |
| Dispersant (1) | | | |
| Dispersant (2) | | | 1.0 |
| Resin (1) | 8.0 | 10.2 | |
| Resin (2) | 0.5 | 0.6 | |
| Solvent (1) | 38.5 | 49.1 | |
| Solvent (2) | | | 30.0 |
| Solvent (3) | | | |
| Solvent (4) | | | |
| Solvent (5) | 13.0 | 16.7 | |
| Solvent (6) | | | 58.6 |
| Solvent (7) | | | |
| Solvent (8) | | | |

TABLE 1 (VI)

|  | Comparative Example | | |
|---|---|---|---|
|  | 5 | 6 | 7 |
| Oleophobic additive (1) | | | 0.4 |
| Oleophobic additive (2) | | | |
| Oleophobic additive (3) | 5.0 | 6.4 | |
| Coagulant (1) | | | |
| Coagulant (2) | | | |
| Coagulant (3) | | | 4.0 |
| Viscosity (mPa · s, 50 rpm) | 10383 | 248 | 238 |
| Viscosity index (n) | 0.99 | 0.99 | 0.25 |
| Contact angle (vehilce) | 36° | 38° | 38° |
| Blobbing | Δ | x | — |
| Writing feeling | Heavy | Light | — |
| Writing performance | Good | Good | Bad |
| Direct flow | Δ | x | — |
| Cap-off performance | ○ | ○ | — |

TABLE 2

|  | Example | | | | Comparative Example | | | |
|---|---|---|---|---|---|---|---|---|
|  | 6 | 7 | 8 | 9 | 8 | 9 | 10 | 11 |
| Colorant (1) | 10.0 | | | | 10.0 | | | |
| Colorant (2) | | | 6.0 | | | | | |
| Colorant (3) | | 10.0 | | 10.0 | | 10.0 | 10.0 | 10.0 |
| Dispersant (1) | | 3.0 | | 3.0 | | 3.0 | 3.0 | 3.0 |
| Dispersant (2) | | | 1.0 | | | | 3.0 | 6.0 |
| Solvent (1) | 90.0 | | | | | | | |
| Solvent (2) | | 71.7 | 20.0 | 67.7 | | 72.0 | 68.7 | 65.7 |
| Solvent (9) | | 1.50 | | 15.0 | 90.0 | 15.0 | 15.0 | 15.0 |
| Solvent (4) | | | 70.8 | | | | | |
| Oleophobic additive (1) | | 0.3 | | 0.3 | | | 0.3 | 0.3 |
| Oleophobic additive (2) | | | 0.2 | | | | | |
| Coagulant (1) | | | 2.0 | 4.0 | | | | |
| Viscosity (mPa · s) | 36 | 485 | 14 | 490 | 11 | 480 | 1250 | 3780 |
| Autolyophobic (ink) | ○ | ○ | Δ | Δ | x | x | Δ | x |
| Contact angle (vehicle) | 22° | 34° | 32° | 35° | 5°> | 5°> | 32° | 5°> |
| Adhesive blobbing | ○ | ○ | ⊙ | ○ | x | x | Δ | Δ |
| Drawn line blobbing | ⊙ | ○ | ⊙ | ○ | x | x | Δ | x |
| Wear (μm) | 9 | 3 | 2 | 3 | 23 | 28 | 5 | 1 |
| Writing feeling | ○ | ○ | ○ | ○ | x | Δ | Δ | x |

Reference Example

An example of an aqueous ink having a middle viscosity is shown in Table 3.

TABLE 3

|  | Reference Example |
|---|---|
| Eosine | 4.5* |
| Acid Phloxine PB | 1.0* |
| Xanthane gum | 0.45* |
| Sodium benzoate | 1.0* |
| Glycerin | 10.0* |
| Ethylene glycol | 21.0* |
| Purified water | 62.05* |
| Viscosity (mPa · s, 50 rpm) | 119.3 |
| Viscosity index (n) | 0.28 |
| Contact angle (vehicle) | 5°> |
| Blobbing | Δ |
| Writing feeling | Light |
| Writing performance | Good |
| Direct flow | ○ |
| Cap-off performance | x |

*parts by weight

I claim:

1. A non-aqueous ink for a ball point pen having a non-Newtonian viscosity index of 0.2 to 0.5 and a viscosity of 200 mPa•s (25° C., 50 rpm) or less which comprises 50 to 95% by weight of organic solvent having a vapor pressure of 0.2 mmHg (20° C.) or less based upon 100% weight of total ink, a colorant and a coagulant.

2. A non-aqueous ink for a ball point pen having a tip holder, said ink having a non-Newtonian viscosity index of 0.2 to 0.5 and a viscosity of 200 mPa•s (25° C., 50 rpm) or less which comprises (a) an autolyophobic vehicle which comprises an organic solvent having a vapor pressure of 0.2 mmHg (20° C.) or less and a pigment dispersant, (b) a coagulant and (c) a pigment, wherein said vehicle has a contact angle to the surface of said tip holder in the range of 5 to 40°.

3. A non-aqueous ink for a ball point pen having a tip holder, said ink having a non-Newtonian viscosity index of 0.2 to 0.5 and a viscosity of 200 mPa•s (25° C., 50 rpm) or less which comprises (a) an autolyophobic vehicle which comprises an organic solvent having a vapor pressure of 0.2 mmHg (20° C.) or less and a dye, and (b) a coagulant, wherein said vehicle has a contact angle to the surface of said tip holder in the range of 5 to 40°.

4. A non-aqueous ink for a ball point pen having a tip holder, said ink having a viscosity of 1000 mPa•s or less and comprising an autolyophobic vehicle which comprises 50 to 95% by weight of an organic solvent based upon 100% weight of total ink, wherein said vehicle has a contact angle to the surface of said tip holder in the range of 5 to 40°.

5. The non-aqueous ink for a ball point pen according to claim 4 which contains a solvent having autolyophobic properties.

6. The non-aqueous ink for a ball point pen according to claim 4 which contains a solvent having no autolyophobic properties and an oleophobic additive.

7. The non-aqueous ink of claim 2, wherein said autolyophobic vehicle further comprises an oleophobic additive.

8. The non-aqueous ink of claim 3, wherein said autolyophobic vehicle further comprises an oleophobic additive.

* * * * *

UNITED STATES PATENT AND TRADEMARK OFFICE
CERTIFICATE OF CORRECTION

PATENT NO. : 6,004,388
DATED : December 21, 1999
INVENTOR(S) : Takahiro Osada

It is certified that error appears in the above-identified patent and that said Letters Patent is hereby corrected as shown below:

Title page,
Section [62], please delete "Mar. 13, 1995" and substitute therefore -- September 13, 1995 --.

Signed and Sealed this

Twenty-eighth Day of August, 2001

*Attest:*

*Attesting Officer*

NICHOLAS P. GODICI
*Acting Director of the United States Patent and Trademark Office*